United States Patent
Balenovic et al.

(10) Patent No.: US 12,345,189 B2
(45) Date of Patent: Jul. 1, 2025

(54) eCAT INFERRED HEATER TEMPERATURE CONTROL TO ENABLE HIGH POWER HEATING DURING LOW FLOW CONDITIONS

(71) Applicant: Ford Global Technologies, LLC, Dearborn, MI (US)

(72) Inventors: Mario Balenovic, Waalre (NL); Frederik De Smet, Zonhoven (BE); Maria Armiento, Aachen (DE); Ke Fan, Würselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 18/063,415

(22) Filed: Dec. 8, 2022

(65) Prior Publication Data
US 2023/0184149 A1    Jun. 15, 2023

(30) Foreign Application Priority Data

Dec. 14, 2021 (DE) .......................... 102021133131.5

(51) Int. Cl.
*F01N 3/20* (2006.01)
*F01N 9/00* (2006.01)

(52) U.S. Cl.
CPC ........... *F01N 3/2013* (2013.01); *F01N 9/005* (2013.01); *F01N 2900/0602* (2013.01); *F01N 2900/1404* (2013.01); *F01N 2900/1411* (2013.01); *F01N 2900/1602* (2013.01); *F01N 2900/1626* (2013.01)

(58) Field of Classification Search
CPC .................. F01N 3/2013; F01N 9/005; F01N 2900/0602; F01N 2900/1404; F01N 2900/1411; F01N 2900/1602; F01N 2900/1626; F01N 2900/1402; F01N 2240/16; F01N 2560/06; F01N 2900/08; F01N 2900/1631; F01N 9/00
See application file for complete search history.

(56) References Cited

U.S. PATENT DOCUMENTS

| | | | | |
|---|---|---|---|---|
| 5,517,848 | A * | 5/1996 | Hosoya | F02D 35/0038 73/23.31 |
| 5,600,947 | A * | 2/1997 | Cullen | F01N 11/00 60/284 |
| 6,167,696 | B1 * | 1/2001 | Maaseidvaag | F01N 3/0835 60/285 |
| 8,413,423 | B2 * | 4/2013 | Roos | F01N 9/00 180/65.265 |

(Continued)

FOREIGN PATENT DOCUMENTS

| | | | | |
|---|---|---|---|---|
| CN | 109404100 A | * | 3/2019 | ........... F01N 3/0842 |
| DE | 19753842 A1 | | 6/1999 | |
| DE | 102019119123 A1 | * | 1/2021 | ............. F01N 11/00 |

*Primary Examiner* — Matthew T Largi
(74) *Attorney, Agent, or Firm* — Vincent Mastrogiacomo; McCoy Russell LLP

(57) ABSTRACT

Methods and systems are provided for an aftertreatment system. In one example, a method includes adjusting operation of an electric heating element based on an exhaust mass flow. The method further includes estimating the electric heating element based on the exhaust mass flow and a temperature of exhaust gas upstream of the electric heating element and downstream of a catalyst.

20 Claims, 2 Drawing Sheets

(56) References Cited

U.S. PATENT DOCUMENTS

| | | | |
|---|---|---|---|
| 11,725,560 B2* | 8/2023 | Webb | F01N 3/021 |
| | | | 60/286 |
| 2010/0223912 A1* | 9/2010 | Larose, Jr. | F01N 9/00 |
| | | | 60/285 |
| 2010/0235141 A1* | 9/2010 | Wang | F02D 41/222 |
| | | | 702/183 |
| 2012/0173062 A1* | 7/2012 | Madurai Kumar | B60W 20/13 |
| | | | 903/903 |
| 2014/0343747 A1* | 11/2014 | Culbertson | G05B 15/02 |
| | | | 700/300 |
| 2019/0155230 A1* | 5/2019 | Culbertson | F01N 3/208 |
| 2022/0136421 A1* | 5/2022 | Luo | F01N 3/2026 |
| | | | 60/300 |

* cited by examiner eCAT INFERRED HEATER TEMPERATURE CONTROL TO ENABLE HIGH POWER HEATING DURING LOW FLOW CONDITIONS

CROSS REFERENCE TO RELATED APPLICATION

The present application claims priority to German Patent Application No. 102021133131.5 filed on Dec. 14, 2021. The entire contents of the above-listed application is hereby incorporated by reference for all purposes.

FIELD

The present description relates generally to inferring a heater temperature of an electrically heated catalyst (eCAT) during low exhaust flow conditions.

BACKGROUND/SUMMARY

A motor vehicle powered by an internal combustion engine may include a catalytic converter to reduce the amount of pollutants in the exhaust gas of the motor vehicle. In order for the catalytic converter to convert the pollutants into non-harmful substances, it may be desired for the catalytic converter to be heated to an operating temperature. However, phases exist in which the temperature of the catalytic converter is below the operating temperature. This is the case, for example, when the motor vehicle is started or after relatively long braking phases (e.g., a cold start). During these phases, in which the temperature of the catalytic converter is below the operating temperature, an increased quantity of pollutants may be emitted. To ameliorate this issue, the motor vehicle may include an electric heating element that is configured to heat the catalytic converter so that it reaches the operating temperature more quickly relative to heating via only exhaust gas, thereby reducing the emissions of the pollutants during the cold-start.

At lower mass flows of the exhaust gas, the electric heating element may overheat, which may result in degradation to the electric heating element. The low mass flows can occur in particular when the internal combustion engine is throttled and/or when exhaust gas recirculation is carried out. To avoid this, the electric heating element may be switched off at the low mass flows to prevent the electric heating element from overheating. However, this may lead to a cooling of the catalytic converter during extended periods of lower mass exhaust flow, and thus to increased emissions of the pollutants.

Therefore, a motor vehicle in which an electric heating element can be operated even at low mass flows of an exhaust gas, wherein the likelihood of overheating of the electric heating element at the low mass flows is reduced is desired.

In one example, the issues described above may be at least partially solved by a method for controlling operation of an electric heating element based on a temperature of a catalyst when an exhaust mass flow is greater than or equal to a threshold flow and controlling operation of the electric heating element based on an estimated temperature of the electric heating element when the exhaust mass flow is less than the threshold flow. In this way, a likelihood of degradation of the electric heating element may be reduced while also reduced emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
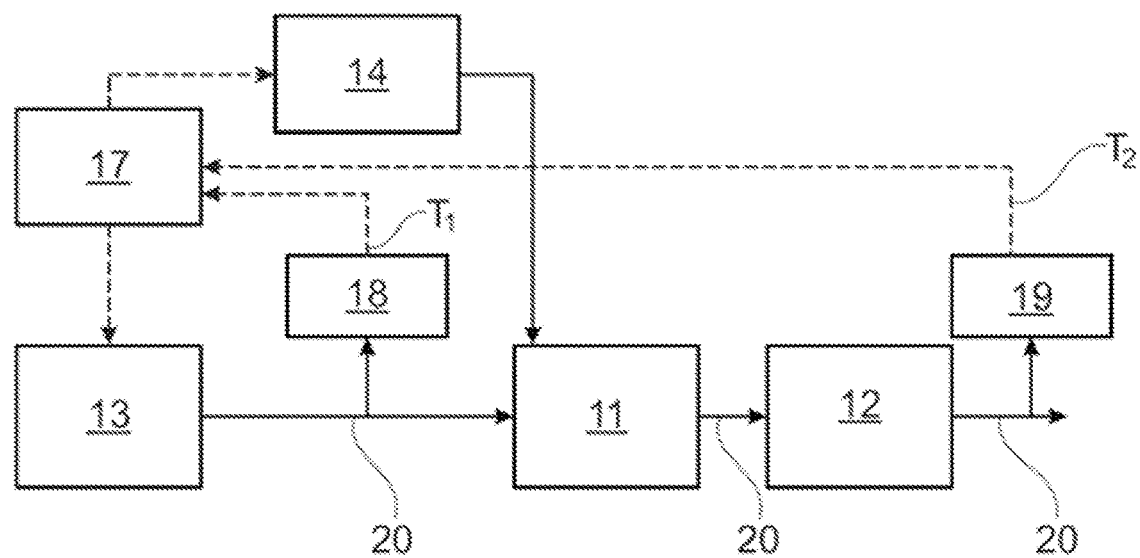
FIG. 1 shows a schematic diagram of components of the motor vehicle.
Figure 2:
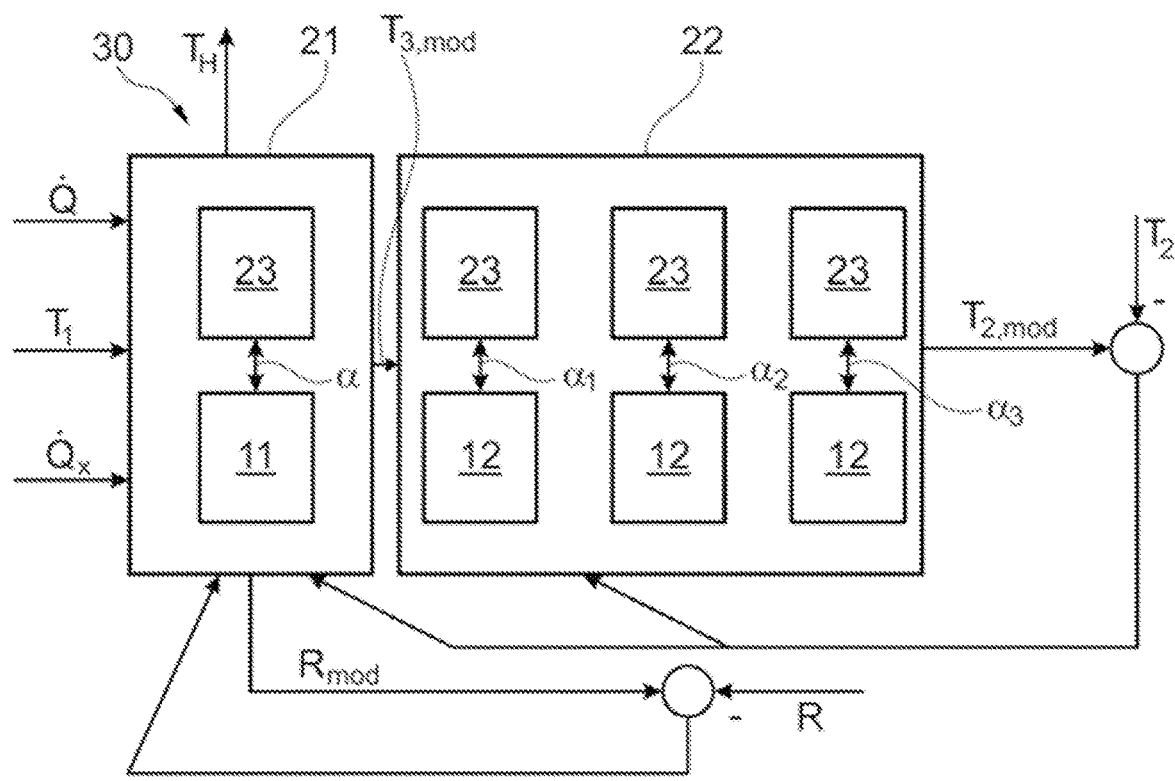
FIG. 2 shows an exemplary observer.

The following description relates to systems and methods for adjusting operation of an electric heating element of a motor vehicle as shown in FIG. 1. An observer may be configured to account for a plurality of inputs to estimate a temperature of the electric heating element when an exhaust mass flow is less than a threshold flow, as shown in FIG. 2. A method for adjusting operation of the electric heating element based on the exhaust mass flow and the temperature of the electric heating element or the temperature of the catalyst.

The motor vehicle according to the disclosure has an internal combustion engine, an exhaust section in which, in operation of the motor vehicle, an exhaust gas of the internal combustion engine to be discharged from the motor vehicle flows and which has a catalytic converter configured to purify the exhaust gas, an electric heating element configured to heat the catalytic converter, a first temperature sensor configured to measure a first temperature of the exhaust gas upstream of the electric heating element, and a second temperature sensor configured to measure a second temperature of the exhaust gas downstream of the electric heating element, and a temperature controller, in which there is implemented an observer configured to model, using the first temperature and the second temperature, a temperature of the electric heating element when a mass flow of the exhaust gas is lower than a limit mass flow, wherein the temperature controller is configured to determine a power demand of the electric heating element in terms of electrical power so that the temperature of the electric heating element remains below a predetermined limit temperature when the mass flow of the exhaust gas is lower than the limit mass flow.

The limit mass flow can be selected so that the electric heating element may not overheat at mass flows of the exhaust gas above the limit mass flow. By providing the observer, it is possible to determine the temperature of the electric heating element with a high degree of accuracy. Thus, it is possible to keep the temperature of the electric heating element below the limit temperature with a high reliability. Now, if the limit temperature is selected so that it is a critical temperature of the catalytic converter at which the catalytic converter starts to degrade, a risk of overheating of the electric heating element is low. As a result, the electric heating element can be operated also at the mass flows of the exhaust gas that are lower than the limit mass flow. For example, this may be the case during a braking maneuver of the motor vehicle. In the case where the motor vehicle is configured to convert a braking energy of the motor vehicle into electric current, the electric current can be supplied directly to the electric heating element. For example, it is not demanded to supply the electric current to an accumulator of the motor vehicle, which involves conversion losses. Also, it is not demanded to waste the electric current in the case that charging of the accumulator is not possible due to an unsuitable state of charge of the accumulator.

The observer is configured to model the temperature of the electric heating element using the mass flow of the exhaust gas. This can increase the accuracy with which the observer models the temperature of the electric heating element.

The second temperature sensor is configured to measure the second temperature of the exhaust gas downstream of the catalytic converter, and the observer is preferably configured to take into account a heat release of a chemical reaction of the exhaust gas at the catalytic converter. This can further increase the accuracy with which the observer models the temperature of the electric heating element. It is particularly preferred that different emission values of the exhaust gas for different operating conditions of the internal combustion engine are stored in the temperature controller, and that the observer is configured to determine the heat release using the emission values. The emission values preferably comprise values for nitrogen oxides, hydrocarbons, and/or carbon monoxide, wherein the emission values comprise in particular mass flows and/or concentrations of the nitrogen oxides and/or carbon monoxide in the exhaust gas.

The observer is configured to model a modeled second temperature of the exhaust gas at the position of the second temperature sensor in the exhaust section. For example, by comparing the modeled second temperature with the second temperature as measured by the second temperature sensor, it is possible to verify how realistic a model implemented in the observer is. Furthermore, by comparing the modeled second temperature with the second temperature, it is possible to identify any faults that may occur in the motor vehicle, in particular in the exhaust section.

The observer is configured to model the modeled second temperature when the mass flow of the exhaust gas is lower than the limit mass flow, wherein the temperature controller is configured to determine the power requirement of the electric heating element also using a deviation of the modeled second temperature from the second temperature when the mass flow of the exhaust gas is lower than the limit mass flow. This can further reduce the risk of overheating of the electric heating element.

The observer is configured to model a heat transfer from the electric heating element to the exhaust gas on the basis of a heat transfer coefficient of the electric heating element, wherein the observer is configured to model the modeled second temperature when the mass flow of the exhaust gas is higher than the limit mass flow, wherein the temperature controller is configured to adjust the heat transfer coefficient of the electric heating element on the basis of a deviation of the modeled second temperature from the second temperature, wherein the deviation occurs when the mass flow of the exhaust gas is higher than the limit mass flow. This allows a fine adjustment of the observer for each individual exhaust section. In addition, it is possible to compensate for changes in the exhaust section due to wear.

The motor vehicle is configured to output an error message, in particular to a driver of the motor vehicle, in the event that the deviation of the modeled second temperature from the second temperature is above a threshold deviation.

The observer is configured to model a heat transfer from the electric heating element to the exhaust gas on the basis of a heat transfer coefficient of the electric heating element. This can increase the accuracy with which the observer models the temperature of the electric heating element.

The observer is configured to model the heat transfer on the basis of a plurality of the heat transfer coefficients that depend on the mass flow of the exhaust gas. This can further increase the accuracy with which the observer models the temperature of the electric heating element.

The motor vehicle is configured to measure an electrical resistance of the electric heating element, and the observer is configured to model a modeled electrical resistance of the electric heating element when the mass flow of the exhaust gas is lower than the limit mass flow, and the temperature controller is configured to determine the power demand of the electric heating element also using a deviation of the modeled electrical resistance of the electric heating element from the electrical resistance of the electric heating element when the mass flow of the exhaust gas is lower than the limit mass flow. This can increase the accuracy with which the observer models the temperature of the electric heating element.

The temperature controller can be configured to determine the power demand of the electric heating element so that the temperature of the catalytic converter is controlled to an operating temperature of the catalytic converter when the mass flow of the exhaust gas is higher than the limit mass flow. As a result, the temperature controller operates in two different modes. If the mass flow of the exhaust gas is lower than the limit mass flow, the temperature of the electric heating element is controlled, more specifically in such a way that the likelihood of overheating of the electric heating element is reduced. If the mass flow of the exhaust gas is higher than the limit mass flow, the temperature of the catalytic converter is controlled, more specifically such that the catalytic converter reaches its operating temperature, which results in low emissions of pollutants.

The temperature controller is configured to control the temperature of the electric heating element to a setpoint temperature (e.g., a threshold element temperature) of the electric heating element when the mass flow of the exhaust gas is lower than the limit mass flow, wherein the setpoint temperature is at least 50° C., in particular at least 70° C. or at least 90° C., lower than a critical temperature of the electric heating element at which the electric heating element starts to degrade.

As can be seen in FIGS. 1 and 2, a motor vehicle has an internal combustion engine 13, an exhaust section 20 and a temperature controller 17. An exhaust gas of the internal combustion engine 13 to be discharged from the motor vehicle flows in the exhaust section 20 during operation of the motor vehicle. The exhaust section 20 includes a catalytic converter 12 (interchangeably referred to herein as a catalyst) which is configured to purify the exhaust gas, an electric heating element 11 which is configured to heat the catalytic converter 12, a first temperature sensor 18 which is configured to measure a first temperature T1 of the exhaust gas upstream of the electric heating element 11, and a second temperature sensor 19 which is configured to measure a second temperature T2 of the exhaust gas downstream of the electric heating element 11. An observer 30 is implemented in the temperature controller 17 and is configured to model, using the first temperature T1 and the second temperature T2, a temperature TH of the electric heating element 11 when a mass flow $Q^.$ of the exhaust gas is lower than a limit mass flow. The temperature controller 17 is configured to determine a power demand of the electric heating element 11 in terms of electrical power such that the temperature TH of the electric heating element 11 remains below a predetermined limit temperature when the mass flow $Q^.$ of the exhaust gas is lower than the limit mass flow. The limit temperature can be, for example, a threshold temperature of the electric heating element 11 at which the electric heating element 11 starts to degrade. In the case where exhaust gas recirculation is provided in the exhaust section 20, the mass flow $Q^.$ of the exhaust gas refers to that portion of the exhaust gas which can be heated by the electric heating element 11. The internal combustion engine 13 may, for example, be a diesel engine or a gasoline engine.

FIG. 1 shows that the first temperature sensor 18 can be arranged upstream of the electric heating element 11. The second temperature sensor 19 can be arranged downstream of the electric heating element 11 and in particular downstream of the catalytic converter 12 relative to the direction of exhaust flow. The electric heating element 11 may be in face-sharing contact with the catalytic converter 12, or alternatively can be arranged upstream of and spaced apart from the catalytic converter 12. In the first case, the electric heating element 11 directly transfers heat to the catalytic converter 12 and, in the second case, the electric heating element 11 indirectly transfers heat to the catalytic converter 12 via the exhaust gas.

FIG. 1 further shows that the motor vehicle can comprise a heating element controller 14 which is controlled by the temperature controller 17, as indicated by the dashed arrow from the temperature controller 17 to the heating element controller 14, and which is configured to apply electric current to the electric heating element 11; compare the solid arrow from the heating element controller 14 to the electric heating element 11. The electric current can originally come from an accumulator of the motor vehicle and/or an electric generator of the motor vehicle, which is configured to convert a rotational energy of a crankshaft of the internal combustion engine 13 into the electric current.

The temperature controller 17 can be included in an electronic control unit configured to control the internal combustion engine 13, as indicated by the dashed arrow from the temperature controller 17 to the internal combustion engine 13.

The first temperature T1 and the second temperature T2 are provided to the temperature controller 17; shown by the dashed arrows from the first temperature sensor 18 and from the second temperature sensor 19 to the temperature controller 17 in FIG. 1.

FIG. 2 shows that the observer 30. In one example, the observer 30 represent a model configured to receive a plurality of inputs and output an estimated temperature of the electric heating element 11. The observer 30 can comprise a model 21 of the heating element 11 and can comprise a model 22 of the catalytic converter 12. The model 21 of the electric heating element 11 can be configured to model a third modeled temperature T3,mod of the exhaust gas downstream of the electric heating element 11 and upstream of the catalytic converter 12. The model 22 of the catalytic converter 12 can be configured to model a second modeled temperature T2,mod downstream of the catalytic converter 12. The model 22 of the catalytic converter 12 is particularly relevant when the second temperature sensor 19 is located downstream of the catalytic converter 12, as shown in FIG. 1. The model 21 of the heating element 11 and/or the model 22 of the catalytic converter 12 can be, for example, a zero-dimensional model in which only a single cell is modeled. Each of the model 21 of the heating element 11 and/or the model 22 of the catalytic converter 12 can be, for example, a one-dimensional model in which a line of cells is modeled, wherein the line is modeled along the direction of flow of the exhaust gas 23. The model 21 of the heating element 11 and/or the model 22 of the catalytic converter 12 can each be, for example, a two-dimensional model or a three-dimensional model. The two-dimensional model may be desired for catalytic converters 12 that are rotationally symmetrical, and the three-dimensional model may be desired for catalytic converters 12 that are not rotationally symmetrical. The one-dimensional model is preferred in terms of accuracy and processing effort.

As can be seen from FIG. 2, the observer 30 can be configured to model, using the mass flow $Q^.$ of the exhaust gas 23, the temperature TH of the electric heating element 11. The observer 30 can be configured to model, using a heat transfer coefficient $\alpha$ of the electric heating element 11, a heat transfer from the electric heating element 11 to the exhaust gas 23. In this regard, the observer 30 can be configured to model the heat transfer on the basis of a plurality of the heat transfer coefficients $\alpha(Q^.)$ that depend on the mass flow $Q^.$ of the exhaust gas 23, in order to account for the fact that the heat transfer is dependent on the flow conditions of the exhaust gas 23.

In the case where the second temperature sensor 19 is configured to measure the second temperature T2 of the exhaust gas downstream of the catalytic converter 12, the observer 30 can be configured to model a heat transfer between the exhaust gas 23 and catalytic converter 12 on the basis of a heat transfer coefficient $\alpha 1$ of the catalytic converter 12 or on the basis of a plurality of heat transfer coefficients $\alpha 1$, $\alpha 2$, $\alpha 3$ of the catalytic converter 12. The multiple heat transfer coefficients $\alpha 1$, $\alpha 2$, $\alpha 3$ relate here to different regions of the catalytic converter 12. Again, the heat transfer coefficients $\alpha 1$, $\alpha 2$, $\alpha 3$ can be dependent on the mass flow $Q^.$ of the exhaust gas 23, i.e., $\alpha 1 = \alpha 1 (Q^.)$, $\alpha 2 = \alpha(2Q^.)$, and $\alpha 3 = \alpha(3Q^.)$.

In the case that the second temperature sensor 19 can be configured to measure the second temperature T2 of the exhaust gas downstream of the catalytic converter 12, the observer 30 can be configured to take into account a heat release of a chemical reaction of the exhaust gas at the catalytic converter 12. To this end, the temperature controller 17 can store various emission values of the exhaust gas for various operating conditions of the internal combustion engine 13, and the observer 30 can be configured to determine the heat release using the emission values. The emission values can comprise values for nitrogen oxides, hydrocarbons, and/or carbon monoxide, wherein the emission values comprise, in particular, mass flows $(Q_x)^.$ of the nitrogen oxides and/or the carbon monoxide.

FIG. 2 shows that the observer 30 can be configured to model a modeled second temperature T2,mod of the exhaust gas at the position of the second temperature sensor 19 in the exhaust section 20.

In addition, the observer 30 can be configured to model the modeled second temperature T2,mod when the mass flow $Q^.$ of the exhaust gas is lower than the limit mass flow, wherein the temperature controller 17 is configured to determine the power demand of the electric heating element 11 also using a deviation of the modeled second temperature T2,mod from the second temperature T2 when the mass flow $Q^.$ of the exhaust gas is lower than the limit mass flow.

The observer 30 is further configured to model a heat transfer from the electric heating element 11 to the exhaust gas on the basis of a heat transfer coefficient α of the electric heating element 11, wherein the observer 30 is configured to model the modeled second temperature T2,mod when the mass flow Q̇ of the exhaust gas is higher than the limit mass flow, wherein the temperature controller 17 is configured to adjust the heat transfer coefficient α of the electric heating element 11 on the basis of a deviation of the modeled second temperature T2,mod from the second temperature T2, wherein the deviation occurs when the mass flow Q̇ of the exhaust gas is higher than the limit mass flow. Here, the motor vehicle can be configured to output an error message to a driver of the motor vehicle in the case that the deviation of the modeled second temperature T2,mod from the second temperature T2 is above a threshold deviation.

The motor vehicle is further configured to measure an electrical resistance R of the electric heating element 11, via a multimeter or similar device, and the observer 30 is configured to model a modeled electrical resistance Rmod of the electric heating element 11 when the mass flow Q̇ of the exhaust gas is lower than the limit mass flow, and the temperature controller 17 is configured to determine the power requirement of the electric heating element 11 also using a deviation of the modeled electrical resistance Rmod of the electric heating element 11 from the electrical resistance R of the electric heating element 11 when the mass flow Q̇ of the exhaust gas is lower than the limit mass flow.

The temperature controller 17 can be configured to determine the power requirement of the electric heating element 11 such that the temperature of the catalytic converter 12 is controlled to an operating temperature of the catalytic converter 12 when the mass flow Q̇ of the exhaust gas is higher than the limit mass flow.

In addition, the temperature controller 17 can be configured to control the temperature TH of the electric heating element 11 to a setpoint temperature of the electric heating element 11 when the mass flow Q̇ of the exhaust gas is lower than the limit mass flow, wherein the setpoint temperature is at least 50° C. lower than a critical temperature of the electric heating element 11 at which the electric heating element 11 starts to degrade.

Figure 3:
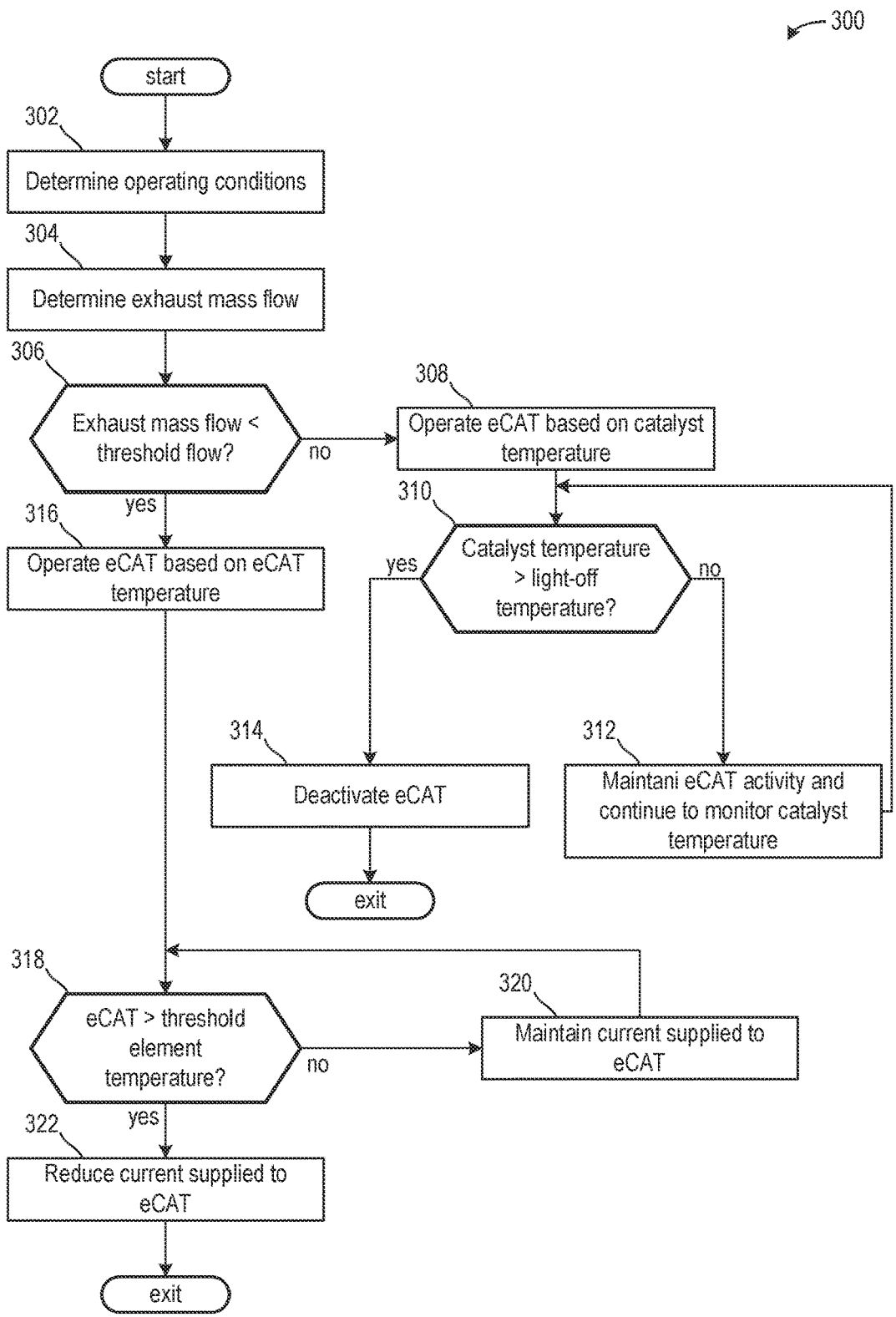
FIG. 3 shows a method for adjusting operation of an electric heating element based on an exhaust mass flow.

Turning now to FIG. 3, it shows a method for adjusting operation of the electric heating element based on operating conditions. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 300 begins at 302, which includes determining operating conditions. Operating conditions may include, but are not limited to, one or more of an engine speed, a manifold vacuum, a throttle position, a vehicle speed, and an air/flow ratio.

At 304, the method 300 may include determining an exhaust mass flow. The exhaust mass flow may be determined based on an exhaust mass recirculation valve position and the air/fuel ratio. Additionally or alternatively, a mass flow sensor may be positioned in the exhaust passage and configured to sense the exhaust mass flow.

At 306, the method 300 may include determining if the exhaust mass flow is less than a threshold flow. The threshold flow may be equal to the limit mass flow. The threshold flow may be based on an exhaust mass flow sufficient to heat the catalyst. If the exhaust mass flow is less than the threshold flow, then the exhaust mass flow may not maintain a temperature of the catalyst or heat the catalyst to a light-off temperature.

If the exhaust mass flow is not less than the threshold flow, then at 308, the method 300 may include operating the electric heating element based on a catalyst temperature. As described above, the catalyst temperature may be determined based on feedback from the second temperature sensor. In one example, the second temperature sensor is configured to measure the second temperature T2 of the exhaust gas downstream of the catalyst (e.g., catalytic converter 12 of FIGS. 1 and 2). The observer can be configured to model a heat transfer between the exhaust gas and catalyst on the basis of a heat transfer coefficient α1 of the catalyst or on the basis of a plurality of heat transfer coefficients α1, α2, α3 of the catalyst. The multiple heat transfer coefficients α1, α2, α3 relate here to different regions of the catalyst. Again, the heat transfer coefficients α1, α2, α3 can be dependent on the mass flow Q̇ of the exhaust gas 23, i.e., α1=α1 (Q̇), α2=α (2Q̇), and α3=α (3Q̇).

Additionally or alternatively, the second temperature sensor may be configured to measure the second temperature T2 of the exhaust gas downstream of the catalyst, the observer may be configured to account for a heat release of a chemical reaction of the exhaust gas at the catalyst. Various emission values of the exhaust gas for various operating conditions of the internal combustion engine may be stored in a look-up table, and the observer may be configured to determine the heat release using the emission values in the look-up table based on one or more inputs, such as mass flow of nitrogen oxides and/or carbon monoxide $Q_x$, the upstream exhaust gas temperature T1, and exhaust mass flow Q.

At 310, the method 300 may include determining if the catalyst temperature is greater than a light-off temperature. The light-off temperature may be based on a temperature where the catalyst is chemically active at a desired efficiency. In one example, the light-off temperature may be a temperature range, wherein the catalyst temperature may be compared to a lower value of the temperature range.

If the catalyst temperature is not greater than the light-off temperature, then at 312, the method 300 may include maintaining the electric heating element activity and continues to monitor the catalyst temperature. As such, the electric heating element may increase a rate of heating of the catalyst during the cold-start, braking event, or other similar vehicle condition.

If the catalyst temperature is greater than the light-off temperature, then at 314, the method 300 may include deactivating the electric heating element. As such, the catalyst is already lit-off and the exhaust mass flow is sufficiently high to maintain the catalyst temperature at the light-off temperature.

Returning to 306, if the exhaust mass flow is less than the threshold flow, then at 316, the method 300 may include operating the electric heating element based on the electric heating element temperature. In one example, a likelihood of overheating the electric heating element may be greater than a likelihood of overheating the catalyst when exhaust mass flow is less than the threshold flow. As such, the operation of the electric heating element may be controlled based on an estimated temperature of the electric heating element.

The temperature TH of the electric heating element may be modeled based on the exhaust mass flow Q. The observer may be configured to model, using a heat transfer coefficient α of the electric heating element, a heat transfer from the electric heating element to the exhaust gas. In this regard, the observer may be configured to model the heat transfer on the basis of a plurality of the heat transfer coefficients $\alpha(Q\dot{})$ that depend on the mass flow $Q\dot{}$ of the exhaust gas, in order to account for the fact that the heat transfer is dependent on the flow conditions of the exhaust gas.

Additionally or alternatively, the observer may be configured to model a modeled second temperature $T2,mod$ of the exhaust gas at the position of the second temperature sensor in the exhaust section.

In addition, the observer may be configured to model the modeled second temperature $T2,mod$ when the mass flow $Q\dot{}$ of the exhaust gas is lower than the limit mass flow, wherein the temperature controller is configured to determine the power demand of the electric heating element also using a deviation of the modeled second temperature $T2,mod$ from the second temperature $T2$ when the mass flow $Q\dot{}$ of the exhaust gas is lower than the limit mass flow.

The observer is further configured to model a heat transfer from the electric heating element to the exhaust gas on the basis of a heat transfer coefficient $\alpha$ of the electric heating element, wherein the observer is configured to model the modeled second temperature $T2,mod$ when the mass flow $Q\dot{}$ of the exhaust gas is higher than the limit mass flow, wherein the temperature controller is configured to adjust the heat transfer coefficient $\alpha$ of the electric heating element on the basis of a deviation of the modeled second temperature $T2,mod$ from the second temperature $T2$, wherein the deviation occurs when the mass flow $Q\dot{}$ of the exhaust gas is higher than the limit mass flow. Here, the motor vehicle can be configured to output an error message to a driver of the motor vehicle in the case that the deviation of the modeled second temperature $T2,mod$ from the second temperature $T2$ is above a threshold deviation.

The motor vehicle is further configured to measure an electrical resistance $R$ of the electric heating element, via a multimeter or similar device, and the observer is configured to model a modeled electrical resistance $Rmod$ of the electric heating element when the mass flow $Q\dot{}$ of the exhaust gas is lower than the limit mass flow, and the temperature controller is configured to determine the power demand of the electric heating element also using a deviation of the modeled electrical resistance $Rmod$ of the electric heating element from the electrical resistance $R$ of the electric heating element when the mass flow $Q\dot{}$ of the exhaust gas is lower than the limit mass flow.

In this way, the temperature controller can be configured to control the temperature $TH$ of the electric heating element to a setpoint temperature of the electric heating element when the mass flow $Q\dot{}$ of the exhaust gas is lower than the limit mass flow, wherein the setpoint temperature based on a temperature at which degradation of the electric heating element may occur.

At 318, the method 300 may include determining if the electric heating element is greater than a threshold element temperature (e.g., the setpoint temperature). If the electric heating element is not greater than the threshold element temperature, then at 320, the method 300 may include maintaining a current supplied to the electric heating element. Additionally or alternatively, the current supplied may continue to follow the modeled electric resistance $Rmod$ based on the mass flow $Q\dot{}$. The electric heating element temperature may continue to be modeled.

If the electric heating element temperature is greater than the threshold element temperature, then at 322, the method 300 may include reducing the current supplied to the electric heating element. In one example, reducing the current supplied to the electric heating element may comprise decreasing the current to zero and deactivating the electric heating element. Additionally or alternatively, the current may be initially reduced by a relatively large amount and gradually increased following the initial reduction to decrease a temperature of the electric heating element while still heating the catalyst. The initial reduction may be proportional to a difference between the electric heating element temperature and the threshold element temperature.

In some examples, additionally or alternatively, the current supplied to the electric heating element may be reduced for a duration of time and returned to an original value after the duration of time elapses.

In this way, a method includes in response to an exhaust mass flow, adjusting operation of an electric heating element in response to an electric heating element temperature or a catalyst temperature. If the exhaust mass flow is less than a threshold flow, then operation of the electric heating element is adjusted based on an estimated temperature of the electric heating element. If the exhaust mass flow is greater than or equal to the threshold flow, then operation of the electric heating element is adjusted based on an estimated temperature of the catalyst. The technical effect of adjusting operation of the electric heating element based on a temperature of the electric heating element or the catalyst in response to the exhaust mass flow is to decrease emissions while also reducing a likelihood of degradation to the electric heating element.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The disclosure provides support for a method including controlling operation of an electric heating element based on a temperature of a catalyst when an exhaust mass flow is greater than or equal to a threshold flow and controlling operation of the electric heating element based on an estimated temperature of the electric heating element when the exhaust mass flow is less than the threshold flow. A first example of the method further includes where the estimated temperature is based on one or more the exhaust mass flow and a heat transfer coefficient. A second example of the method, optionally including the first example, further includes where the temperature of the catalyst is based on a temperature of exhaust gas downstream of the catalyst and a plurality of heat transfer coefficients, wherein the plurality of heat transfer coefficients corresponds to heat transfer coefficients of different areas of the catalyst. A third example of the method, optionally including one or more of the previous examples, further includes where the temperature of the catalyst is further based on a mass flow of nitrogen oxides and carbon monoxide. A fourth example of the method, optionally including one or more of the previous examples, further includes modeling an electrical resistance of the electric heating element when the exhaust mass flow is less than the threshold flow. A fifth example of the method, optionally including one or more of the previous examples, further includes where controlling operation of the electric heating element when the exhaust mass flow is less than the threshold flow comprises reducing a current supplied thereto in response to the estimated temperature being greater than a threshold element temperature. A sixth example of the method, optionally including one or more of the previous examples, further includes where controlling operation of the electric heating element when the exhaust mass flow is greater than or equal to the threshold flow comprises deactivating the electric heating element in response to the temperature of the catalyst being greater than or equal to a light-off temperature.

The disclosure provides additional support for a system including an engine coupled to an exhaust passage, a catalyst arranged downstream of an electric heating element along the exhaust passage relative to a direction of exhaust gas flow, and a controller with computer-readable instructions stored on memory that cause the controller to estimate a temperature of the electric heating element based on feedback from a first temperature sensor and a second temperature sensor in combination with an exhaust mass flow when the exhaust mass flow is less than a threshold flow. A first example of the system further includes where the instructions further cause the controller to determine a power demand of the electric heating element, and wherein an electrical power supplied to the electric heating element is reduced in response to the temperature of the electric heating element exceeding a threshold element temperature when the exhaust mass flow is less than the threshold flow. A second example of the system, optionally including the first example, further includes where the first temperature sensor is upstream of the electric heating element and the second temperature sensor is downstream of the catalyst. A third example of the system, optionally including one or more of the previous examples, further includes where the instructions further cause the controller to estimate a temperature of the catalyst based on feedback from the first temperature sensor and the second temperature sensor in combination with the exhaust mass flow when the exhaust mass flow is greater than or equal to the threshold flow. A fourth example of the system, optionally including one or more of the previous examples, further includes where the instructions further cause the controller to estimate the temperature of the catalyst further based on a heat release of a chemical reaction between the exhaust gas and the catalyst, the heat release based on a mass flow of one or more nitrogen oxides, hydrocarbons, and carbon monoxide from the catalyst. A fifth example of the system, optionally including one or more of the previous examples, further includes where the instructions further cause the controller to modify feedback form the second temperature sensor to account for heat transfer from the electric heating element to the exhaust mass flow. A sixth example of the system, optionally including one or more of the previous examples, further includes where the instructions further cause the controller to reduce an electric power supplied to the electric heating element in response to the temperature of the catalyst being greater than or equal to a light-off temperature. A seventh example of the system, optionally including one or more of the previous examples, further includes where the instructions further cause the controller to maintain the electric power supplied to the electric heating element in response to the temperature of the catalyst being less than the light-off temperature.

The disclosure provides additional support for a method for an aftertreatment system including in response to an exhaust mass flow being greater than or equal to a threshold flow, estimating a temperature of a catalyst based on the exhaust mass flow, a plurality of heat transfer coefficients, an upstream exhaust temperature, a downstream exhaust temperature, and a heat release of a chemical reaction between exhaust gas and the catalyst, controlling an electrical power supplied to an electric heating element in response to the temperature of the catalyst, in response to the exhaust mass flow being less than the threshold flow, estimating a temperature of the electric heating element based on the exhaust mass flow a heat transfer coefficient different than the plurality of heat transfer coefficients, the upstream exhaust temperature, and the downstream exhaust temperature, and controlling the electrical power supplied to the electric heating element in response to the temperature of the electric heating element. A first example of the method further includes where controlling the electrical power supplied to the electric heating element in response to the exhaust mass flow being greater than or equal to the threshold flow comprises maintaining the electrical power in response to the temperature of the catalyst being less than a light-off temperature, further comprising decreasing the electric power in response to the temperature of the catalyst being greater than or equal to the light-off temperature. A second example of the method, optionally including the first example, further includes where controlling the electrical power supplied to the electric heating element in response to the exhaust mass flow being less than the threshold flow comprises maintaining the electrical power in response to the temperature of the electric heating element being less than a threshold element temperature, further comprising decreasing the electric power in response to the temperature of the electric heating element being greater than or equal to the threshold element temperature. A third example of the method, optionally including one or more of the previous examples, further includes where the plurality of heat coefficients each correspond to different sections of the catalyst. A fourth example of the method, optionally including one or more of the previous examples, further includes where the downstream exhaust temperature is modified to account for heat transfer from the electric heating element to exhaust gas when the exhaust mass flow is greater than or equal to the threshold flow.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
when an exhaust mass flow is greater than or equal to a threshold flow, controlling operation of an electric heating element based on a temperature of a catalyst; and
when the exhaust mass flow is less than the threshold flow,
modeling an electrical resistance of the electric heating element,
determining a power requirement of the electric heating element based on a deviation of the modeled electrical resistance of the electric heating element from a measured electrical resistance of the electric heating element, and
controlling operation of the electric heating element based on a comparison between an estimated temperature of the electric heating element and a threshold element temperature.

2. The method of claim 1, wherein the estimated temperature is based on one or more of the exhaust mass flow and a heat transfer coefficient.

3. The method of claim 1, wherein the temperature of the catalyst is based on a temperature of exhaust gas downstream of the catalyst and a plurality of heat transfer coefficients, and wherein the plurality of heat transfer coefficients corresponds to heat transfer coefficients of different areas of the catalyst.

4. The method of claim 3, wherein the temperature of the catalyst is further based on a mass flow of nitrogen oxides and carbon monoxide.

5. The method of claim 1, wherein the power requirement of the electric heating element is further determined based on a deviation of a modeled temperature downstream of the catalyst from a measured temperature downstream of the catalyst.

6. The method of claim 1, wherein controlling operation of the electric heating element when the exhaust mass flow is less than the threshold flow further comprises reducing a current supplied thereto in response to the estimated temperature being greater than the threshold element temperature.

7. The method of claim 1, wherein controlling operation of the electric heating element when the exhaust mass flow is greater than or equal to the threshold flow comprises deactivating the electric heating element in response to the temperature of the catalyst being greater than or equal to a light-off temperature.

8. A system, comprising:
an engine coupled to an exhaust passage;
a catalyst arranged downstream of an electric heating element along the exhaust passage relative to a direction of exhaust gas flow; and
a controller with computer-readable instructions stored on memory that cause the controller to:
responsive to an exhaust mass flow less than a threshold flow, model an electrical resistance of the electric heating element when the exhaust mass flow is less than a threshold flow;
determine a power demand of the electric heating element based on a deviation of the modeled electrical resistance of the electric heating element from a measured electrical resistance of the electric heating element;
estimate a temperature of the electric heating element based on feedback from a first temperature sensor and a second temperature sensor in combination with the exhaust mass flow; and
operate the electric heating element based on a comparison between the temperature of the electric heating element and a threshold element temperature.

9. The system of claim 8, wherein an electrical power supplied to the electric heating element is reduced in response to the temperature of the electric heating element exceeding the threshold element temperature when the exhaust mass flow is less than the threshold flow.

10. The system of claim 8, wherein the first temperature sensor is upstream of the electric heating element and the second temperature sensor is downstream of the catalyst.

11. The system of claim 8, wherein the instructions further cause the controller to estimate a temperature of the catalyst based on feedback from the first temperature sensor and the second temperature sensor in combination with the exhaust mass flow when the exhaust mass flow is greater than or equal to the threshold flow.

12. The system of claim 11, wherein the instructions further cause the controller to estimate the temperature of the catalyst further based on a heat release of a chemical reaction between the exhaust gas and the catalyst, the heat release based on a mass flow of one or more of nitrogen oxides, hydrocarbons, and carbon monoxide from the catalyst.

13. The system of claim 11, wherein the instructions further cause the controller to modify feedback from the second temperature sensor to account for heat transfer from the electric heating element to the exhaust mass flow.

14. The system of claim 11, wherein the instructions further cause the controller to reduce an electric power supplied to the electric heating element in response to the temperature of the catalyst being greater than or equal to a light-off temperature.

15. The system of claim 14, wherein the instructions further cause the controller to maintain the electric power supplied to the electric heating element in response to the temperature of the catalyst being less than the light-off temperature.

16. A method for an aftertreatment system, comprising:
 in response to an exhaust mass flow being greater than or equal to a threshold flow, estimating a temperature of a catalyst based on the exhaust mass flow, a plurality of heat transfer coefficients, an upstream exhaust temperature, a downstream exhaust temperature, and a heat release of a chemical reaction between exhaust gas and the catalyst;
 controlling an electrical power supplied to an electric heating element in response to the temperature of the catalyst;
 in response to the exhaust mass flow being less than the threshold flow,
  modeling an electrical resistance of the electric heating element;
  determining a power requirement of the electric heating element based on a deviation of the modeled electrical resistance of the electric heating element from a measured electrical resistance of the electric heating element;
  estimating a temperature of the electric heating element based on the exhaust mass flow, a heat transfer coefficient different than the plurality of heat transfer coefficients, the upstream exhaust temperature, and the downstream exhaust temperature; and
  controlling the electrical power supplied to the electric heating element in response to a comparison between the temperature of the electric heating element and a threshold element temperature.

17. The method of claim 16, wherein controlling the electrical power supplied to the electric heating element in response to the exhaust mass flow being greater than or equal to the threshold flow comprises maintaining the electrical power in response to the temperature of the catalyst being less than a light-off temperature, the method further comprising decreasing the electric power in response to the temperature of the catalyst being greater than or equal to the light-off temperature.

18. The method of claim 16, wherein controlling the electrical power supplied to the electric heating element in response to the exhaust mass flow being less than the threshold flow comprises maintaining the electrical power in response to the temperature of the electric heating element being less than the threshold element temperature, the method further comprising decreasing the electric power in response to the temperature of the electric heating element being greater than or equal to the threshold element temperature.

19. The method of claim 16, wherein the plurality of heat coefficients each correspond to different sections of the catalyst.

20. The method of claim 16, wherein the downstream exhaust temperature is modified to account for heat transfer from the electric heating element to exhaust gas when the exhaust mass flow is greater than or equal to the threshold flow.

* * * * *